May 13, 1930.                H. WACH                1,758,267
RECIPROCATING STEAM ENGINE
Filed Sept. 15, 1926
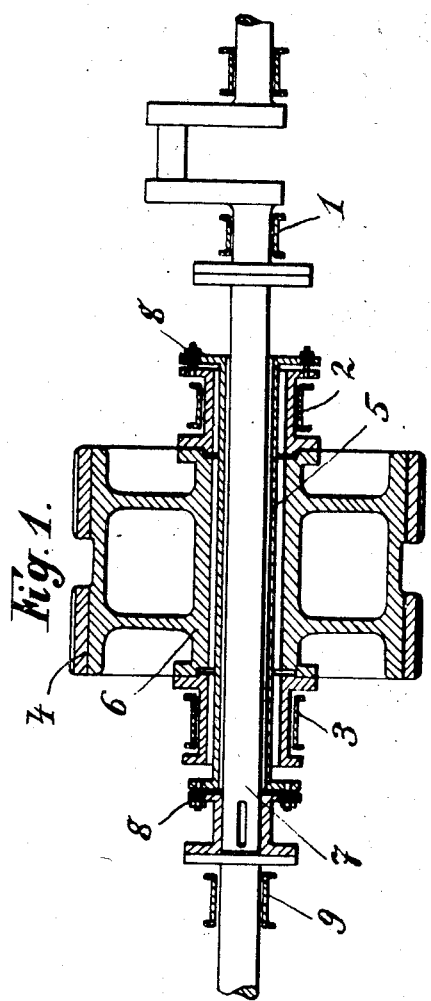
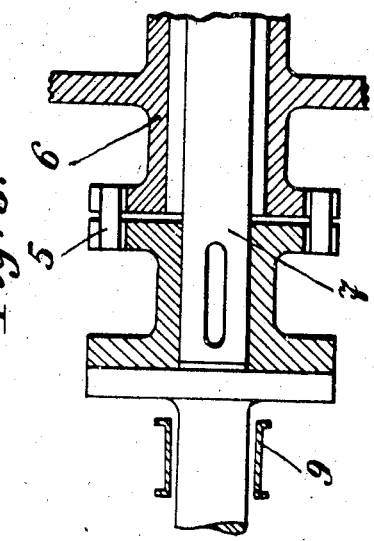
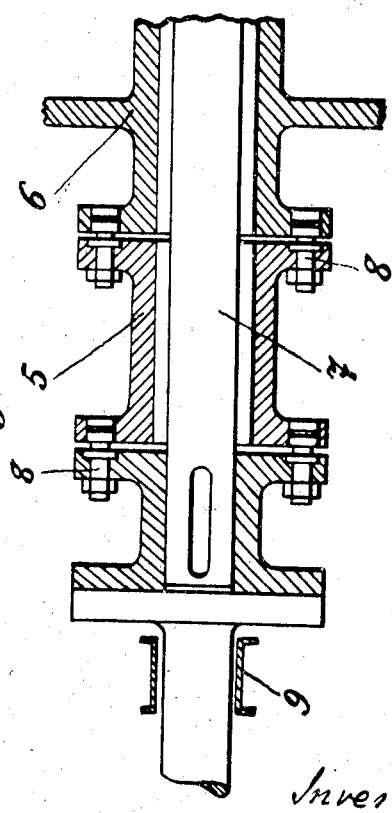
Inventor:
Hans Wach Patented May 13, 1930

1,758,267

UNITED STATES PATENT OFFICE

HANS WACH, OF WESERMUNDE-LEHE, GERMANY

RECIPROCATING STEAM ENGINE

Application filed September 15, 1926. Serial No. 135,657.

The subject matter of the present invention is a reciprocating steam engine in which the crank-shaft or its extension is connected by means of a gear with an exhaust steam turbine.

The invention consists in the provision of an intermediate member between the shafting or the crank-shaft and the hollow shaft carrying the toothed wheel or the large toothed wheel which is constructed as a hollow shaft.

More particularly, the invention is designed for a reciprocating steam engine combined with an exhaust steam turbine which delivers its additional output by means of a wheel gearing direct to the shaft of the reciprocating steam engine. In such a plant, the mounting of the gear is of considerable importance. As is well known, the main bearings of reciprocating steam engines become very rapidly worn so that in a short time, the crank-shaft considerably changes its position. If the gear is mounted on the shaft, which is immediately connected with the crank-shaft, the shaft of the gear, because of the displacement of the crank-shaft, will be very considerably affected. However, as the gear must always remain in true position and as the effect of any displacement of the crank-shaft on its mounting can have very serious consequences, it is an essential advantage, if the mounting of the gear is made independent of the mounting of the reciprocating engine.

In the accompanying drawing, on which I have illustrated the invention, by way of example, in a diagrammatic manner, Fig. 1 shows one embodiment of the invention; Figs. 2 and 3 show modifications.

In Fig. 1, the last main bearing of the reciprocating steam engine is shown at 1, while 2 and 3 are the bearings for the large wheel 4 of the gear. 5 denotes a hollow shaft, which constitutes the intermediate member and is interposed between the hollow shaft 6 carrying the large wheel 4 and the line shaft 7 and which transmits to the latter the output of the exhaust steam turbine.

Because of said intermediate member 5 the line shaft 7 can be somewhat displaced or eccentrically positioned relative to the hollow shaft 6, because the said intermediate member is to a certain extent flexible.

As shown in Fig. 2, the intermediate member 5' can also be connected with a flange of hollow shaft 6, as, for instance, by bolts 8, which permit a certain flexibility or with a flange of line shaft 7, as shown in Fig. 1. Therefore, if the bearings 9 or the main bearings 1 of the reciprocating steam engine become worn, or if their position is changed, the bearings 2 and 3 of the large toothed wheel 4 will not be affected thereby.

The same arrangement is also possible where the hollow shaft 6 and the intermediate member are placed between two cranks of a crank-shaft.

In Fig. 2, the intermediate member 5' is made as an extension of the hollow shaft 6.

In Fig. 3, several intermediate members 5" are provided which, in this embodiment, constitute connecting pieces between a flange of the hollow shaft 6 and a flange of the line shaft 7.

I claim:—

1. In a reciprocating steam engine and turbine power plant, an engine shaft for receiving power from the engine, a hollow shaft adapted to receive power from the turbine and concentric with said engine shaft, and means operatively connecting said engine shaft and said hollow shaft comprising a flexible member.

2. In a reciprocating steam engine and turbine power plant, an engine shaft for receiving power from the engine, a hollow shaft adapted to receive power from the turbine and concentric with said engine shaft, a tubular member, a flexible connection between said member and the engine shaft, and a flexible connection between said member and said hollow shaft.

3. In a reciprocating steam engine and turbine power plant, an engine shaft for receiving power from said engine, a hollow shaft adapted to receive power from said turbine and concentric with said engine shaft, a tubular member concentric with said engine shaft, a flexible connection between said member and said engine shaft and a flexible connection between said member and said hollow shaft.

4. In a reciprocating steam engine and turbine power plant, an engine shaft for receiving power from the engine, a hollow shaft adapted to receive power from the turbine and concentric with said engine shaft, a hollow connecting member concentric with said engine shaft, and means flexibly connecting one end of said connecting member with the engine shaft, and the other end of said connecting member with the hollow shaft.

5. In a reciprocating steam engine and turbine power plant, an engine shaft for receiving power from the engine, a hollow shaft adapted to receive power from the turbine and concentric with said engine shaft, a hollow connecting member concentric with and positioned between said shafts, and means flexibly connecting one end of said connecting member with the engine shaft, and the other end of said connecting member with the hollow shaft.

In testimony whereof I affix my signature.

HANS WACH.